Patented Nov. 23, 1926.

1,607,920

UNITED STATES PATENT OFFICE.

JUNJIRO SATO, OF HIGHLAND PARK, MICHIGAN.

STORAGE-BATTERY ELEMENT.

No Drawing. Application filed April 4, 1924. Serial No. 704,286.

This invention relates to a storage battery and has for its object to provide compositions for the positive and negative plates which will adhere firmly to the supporting grids at a higher degree of acidity than is feasible with compositions at present used, whereby the strength of the electrolyte used while charging may be less than that now customarily used. By the use of the compositions herein described, the acidity may be more uniformly distributed throughout the cell and the damage caused by the strong acid of the electrolyte now required will be obviated, thus giving the plates greater endurance under ordinary conditions of use.

The ordinary storage battery consists of two sets of electrodes, positive and negative, immersed in an electrolyte. The electrodes as ordinarily made comprise supporting grids of thin lead, the spaces being filled with pastes of various compositions which are treated with an electric current in what is known as the forming charge to produce positive and negative plates. The negative electrodes are of sponge lead, and the positive electrodes consist mainly of peroxide of lead ($PbO_2$). The electrolyte is dilute sulfuric acid. The positive and negative electrodes are arranged alternately within a cell, the plates usually being set vertically, the adjacent plates being of opposite polarity and separated from each other by insulating means commonly consisting of thin grooved wooden or hard rubber separators. In preparing the negative plates, grids having their spaces filled with litharge, (PbO) are connected as cathodes with lead sheets as anodes in a bath of dilute sulfuric acid, and current is passed through the cell. Hydrogen set free on passage of the current reduces the litharge to spongy metallic lead which is porous and which should be firmly adherent to the supporting grid of lead.

The positive plates consist of similar grids in which the pastes primarily consist of red lead ($Pb_3O_4$) with a smaller percentage of litharge. These are connected as cathodes with plates of sheet lead as anodes, and when current is passed through the group immersed in dilute sulfuric acid, the red lead on the positive plates is changed to lead peroxide ($PbO_2$).

In forming the pastes it is desirable to use a substance which will cause the powdered material to harden or set and sulfuric acid has this property, but if used in too great concentration difficulty is found in causing the paste to adhere to the grid. Substances are sometimes added to increase the porosity of the active material, such a substance being pulverized pumice stone and for the purpose of increasing the conductivity of the resulting active material, pulverized carbon usually in the form of lamp black may be added to the paste used in negative plates. In addition to these materials which has hitherto been used, I have found that if a binder, as asbestos fiber, in suitable proportion is added to the active materials it will act as a cement to bind them together and to retard their disintegration in use. Furthermore, when asbestos or the like forms a part of the composition the strength of the acid used to mix the paste may be increased without loss of adhesion so that the dried paste may be made of a higher acidity than has hitherto been considered feasible.

As a further means of preventing loosening of the paste from the grid, I have found that a coating formed by dipping the pasted plates in a suspension of fine asbestos in water, will act as a cementitious surface layer which will greatly prolong the durability of the plates.

The method which I consider best in the preparation of plates is as follows: For the positive plates sixty parts of red lead are mixed with forty parts of litharge, a sufficient quantity of sulfuric acid of specific gravity 1.100, being added to form a suitable paste which is thoroughly mixed. After pasting, the plates are allowed to dry in the air for twenty-four hours. The dried plates are dipped into sulfuric acid of specific gravity 1.100 and then dried again twelve hours, heat maintaining therein a temperature of about 100° F. The plates are then ready for the forming charge, a current of about 1½ amperes being used with the plates in an acid solution of specific gravity 1.100.

The negative plates will be prepared by making a mixture of ninety-eight parts of litharge with 1.80 parts binding material, as asbestos, and 0.20 part lamp black being thoroughly mixed. To this dry mixture sufficient sulfuric acid of specific gravity 1.100 is added to form a suitable paste. The paste is then applied to the grids in the usual manner. After the plates are dried in the air for twenty-four hours they are dipped in sulfuric acid of specific gravity 1.100, again dried twelve hours, heat being maintained at a temperature of about 100 degrees F. The forming charge will be about 1½ amperes in a bath of sulfuric acid of specific gravity 1.100.

The positive and negative plates so formed will be assembled in a cell with the usual separators of wood or hard rubber, and the terminals of the plates of like polarity will be connected together in groups in the usual manner.

In the charging of a battery electrolyte is usually sulfuric acid of specific gravity 1.350 to 1.360 (corresponding to about 45% $H_2SO_4$) and when fully charged the electrolyte will be down to a specific gravity of about 1.285 (corresponding to about 37.5% $H_2SO_4$).

With plates prepared according to the preferred composition herein set forth the electrolyte may have a specific gravity of 1.300 and after charging it will be found that the electrolyte will remain at substantially the same specific gravity.

It is believed that the increased durability of a battery having plates prepared as set forth is due to the more even distribution of the acid through the cell than has been possible in the methods of preparation heretofore used.

What I claim is:—

A storage battery comprising positive plates consisting of metallic grids containing an acid mixture of lead peroxide and asbestos, and negative plates consisting of metallic grids, containing an acid mixture of spongy lead, asbestos, and carbon.

In testimony whereof I affix my signature.

JUNJIRO SATO.